UNITED STATES PATENT OFFICE.

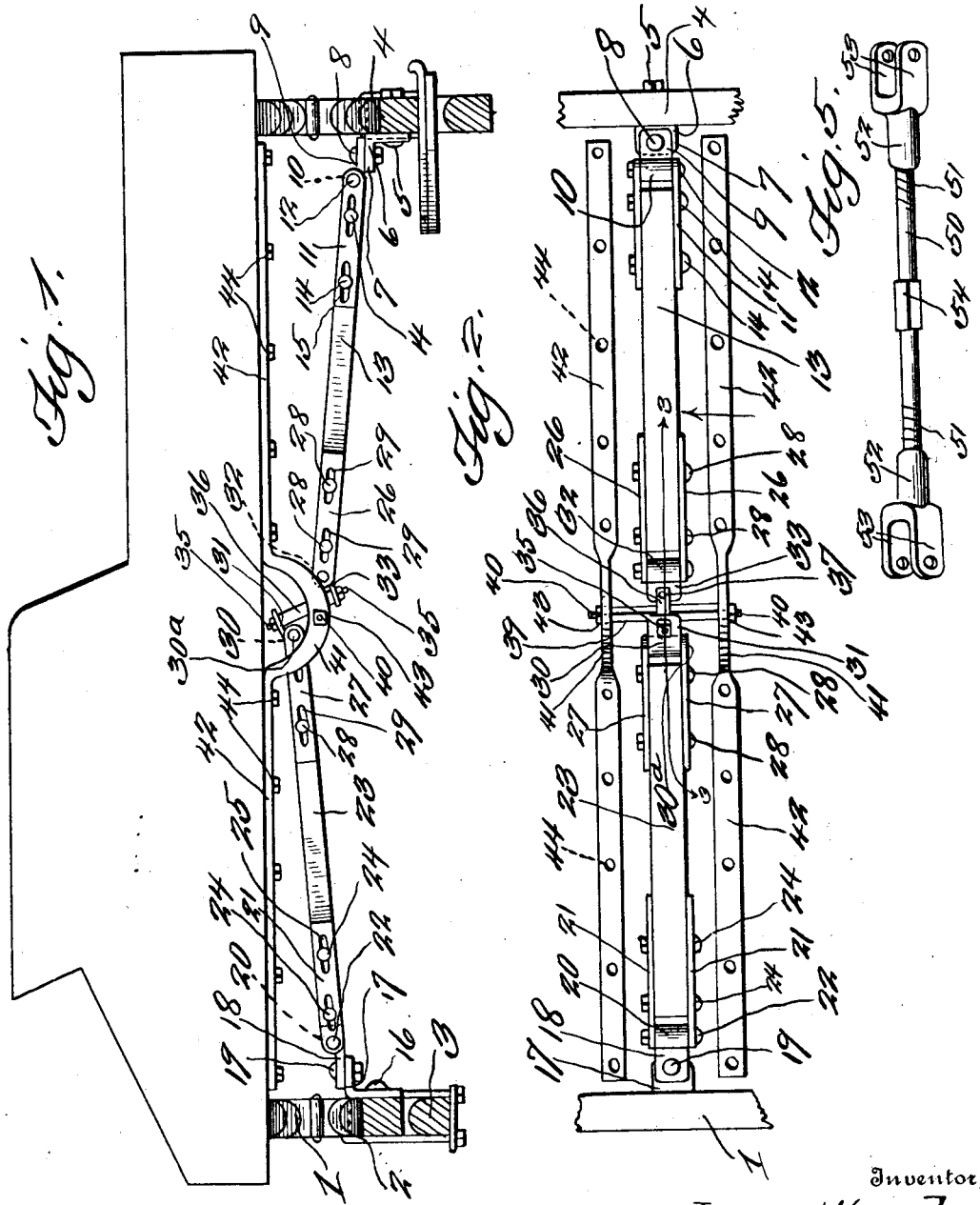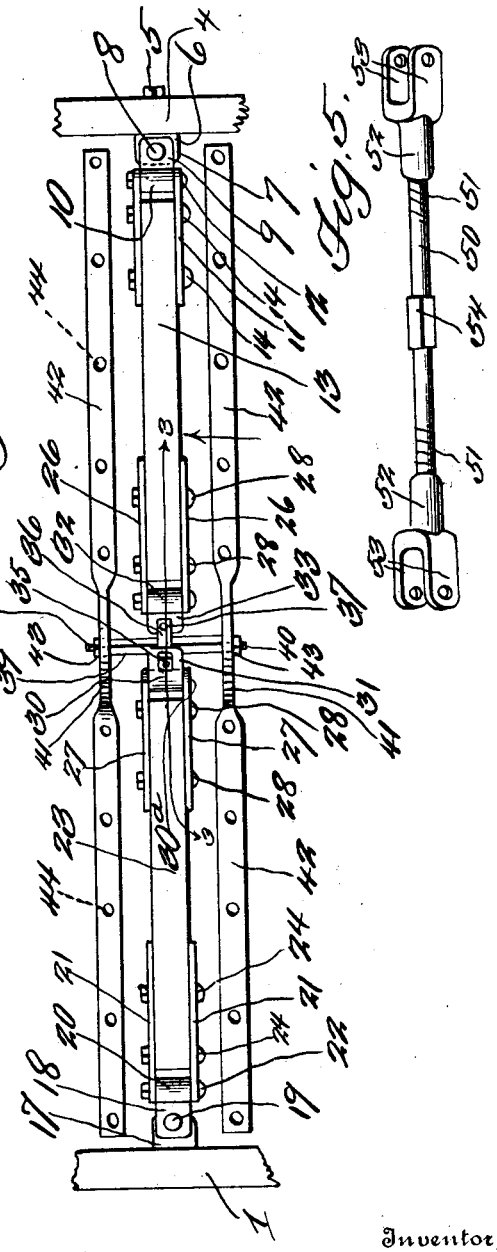

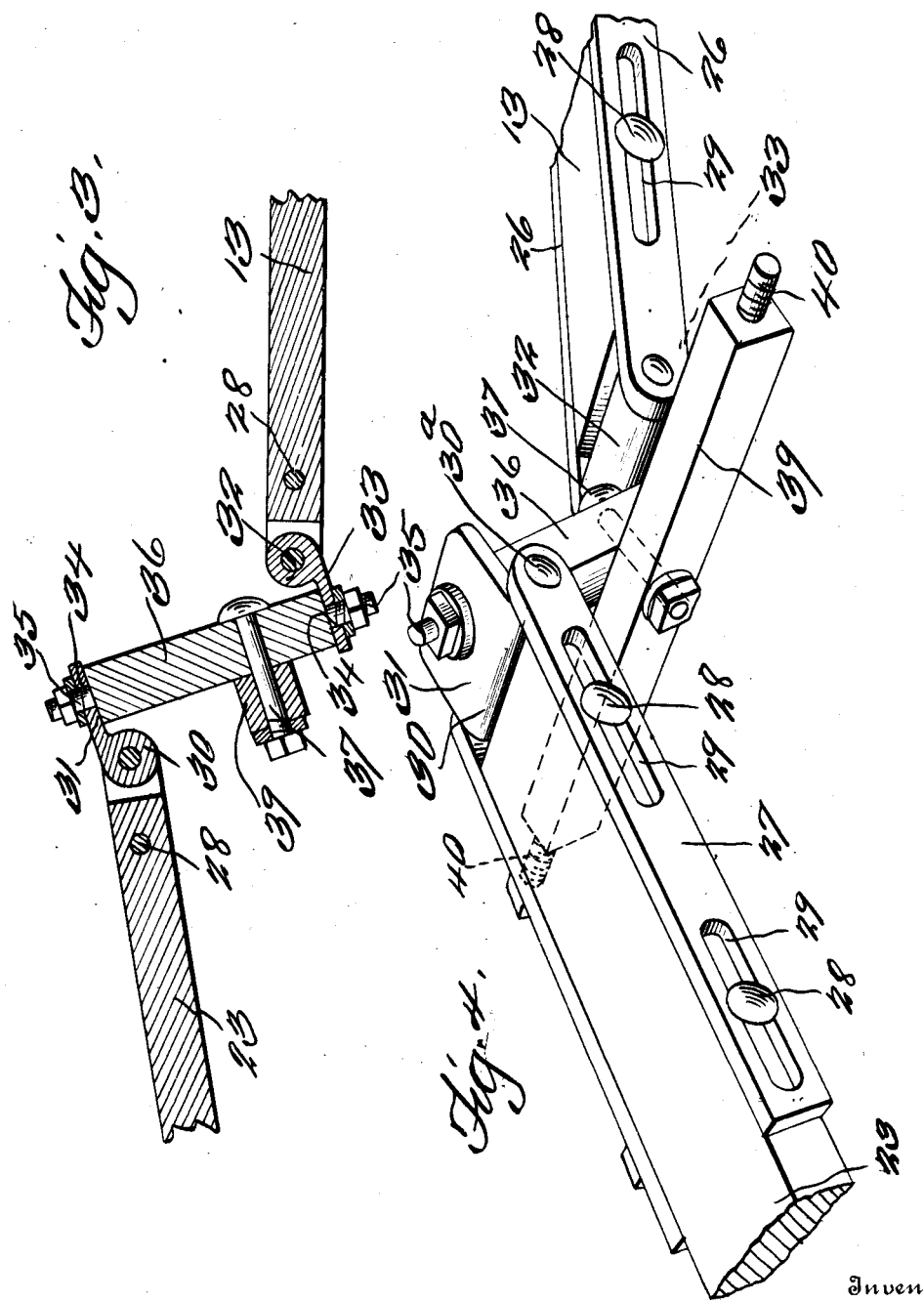

LEO WAND, OF ELIZABETH, ILLINOIS.

VEHICLE-SUPPORT.

1,077,445. Specification of Letters Patent. Patented Nov. 4, 1913.

Application filed June 12, 1913. Serial No. 773,301.

*To all whom it may concern:*

Be it known that I, LEO WAND, a citizen of the United States, residing at Elizabeth, in the county of Jo Daviess and State of Illinois, have invented a new and useful Vehicle-Support; and I do hereby declare the following to be a full, clear, and exact description of the invention, such as will enable others skilled in the art to which it appertains to make and use the same.

This invention relates to a new and useful vehicle body support.

An object of this invention is to provide a support to prevent the wagon body from swinging back and forth as the wagon body moves vertically upon the vehicle spring, as well as steadying the springs in their relative and proper positions, without interference with the free action of the spring.

Another object of the invention is the provision of a support of this nature that can be used with great advantage in connection with an old vehicle, in order to reinforce the loose springs.

Another object of the invention is to provide a support of this nature, that will prevent lateral movement of the body, and also absorb the lateral strains.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view showing the application of the improved vehicle body support. Fig. 2 is a plan view of the support detached. Fig. 3 is a sectional view on line 3—3 of Fig. 2. Fig. 4 is an enlarged detail view of a portion of said support. Fig. 5 is a detail view showing a modified connection between the rolls 10 and 32 and 20 and 30.

Referring more particularly to the drawings, 1 designates the rear spring of the vehicle running gear, fixed in the usual manner, as at 2 to the rear axle 3. Secured to the forward running gear 4 by means of the bolt 5 is an angular plate 6, and secured to the part 7 of the plate 6 by means of the bolt 8 is a plate 9, which is provided with a roll 10. Passing through the plate straps 11 and through the roll 10 is a bolt 12. One of the plate straps 11 is secured on each side of a reach bar 13, by means of the bolts 14, there being slots 15 in the plates 11, so as to allow the plates to be adjusted longitudinally relative to the bar 13.

Secured to the rear axle 3 by means of the bolts 16 is an angular plate 17, to which the plate 18 is secured by the bolt 19. The plate 18 is provided with a roll 20, which is arranged between the ends of the plates 21, there being a bolt 22 passing through the plates 21 and the rolls 20. These plates 21 are secured to the reach bar 23, one upon each side, by means of the bolt 24, which extends through the slots 25 of the plates 21, and by provision of the slots the plates may be adjusted.

Secured to the adjacent end portions of the bars 13 and 23 are plates 26 and 27, by means of the bolts 28, which likewise extend through slots 29 of said plates 26 and 27. The slots 29 also permit of the adjustment of the plates 26 and 27. Secured between the ends of the plates 27 is a roll 30 of the plate 31, while secured between the plates 26 is a roll 32 of the plate 33. The plates 31 and 33 are provided with apertures 34, which receive the reduced ends 35 of the vertically arranged pin 36, there being nuts upon the reduced ends 35 to hold the plates 31 and 33 in position. This vertically arranged pin 36 is bolted or otherwise secured by means of the bolt 37 to a transverse pin 39, which is provided with reduced ends 40, which enter the offset curved portions 41 of the supporting bars 42. Nuts 43 are secured on the ends 40 of the pin 39 to hold the offset curved portions 41 in place. The supporting bars 42 are bolted at 44 to the body of the vehicle.

It will be seen that as the body of the vehicle moves vertically incident to the action of the springs of the running gear, the pin 39 will rock, and with it the pin 36, and owing to the fact that the pin 36 is bolted so as to have a slight pivotal action, the body of the vehicle is adapted to rock laterally. Furthermore, by this construction of vehicle body support it is apparent the springs, as well as the entire running gear are reinforced and steadied, incident to obstructions in the path of the wheels of the vehicle.

In Fig. 5 there is disclosed a rod 50 provided with threads 51 at each end. The threaded ends 51 are connected or threaded into the sleeves 52, which sleeves are provided with ears or lugs 53. The rod 50 may be rotated, so as to adjust the same relative to the sleeves 52, by taking hold of the rectangular enlargement 54. In lieu of the connections 13 and 23, and the plates 11, 26, 21 and 27, the rod including the sleeves 52 and ears 53 may be substituted.

The invention having been set forth, what is claimed as new and useful is:—

In combination with the forward and rear running gears of a vehicle, a pair of supporting bars constructed with opposed offset portions extending downwardly, said supporting bars adapted to be secured to a vehicle body, a rock pin mounted in said offset portions, a second pin arranged vertically and pivoted to the first pin to oscillate laterally, a reach bar connected at one end to the rear running gear while its other end is connected to the lower end of the vertically arranged pin, a second reach bar having one end connected to the forward running gear and its other end connected to the upper end of the vertical pin.

In testimony whereof I have signed my name to this specification in the presence of two subscribing witnesses.

LEO WAND.

Witnesses:
S. B. REYNOLDS,
A. E. MOUGIN.